April 2, 1929. F. A. WHITTEN 1,707,747
FLOOR PLATE AND STEERING COLUMN SUPPORT
Filed Nov. 6, 1925
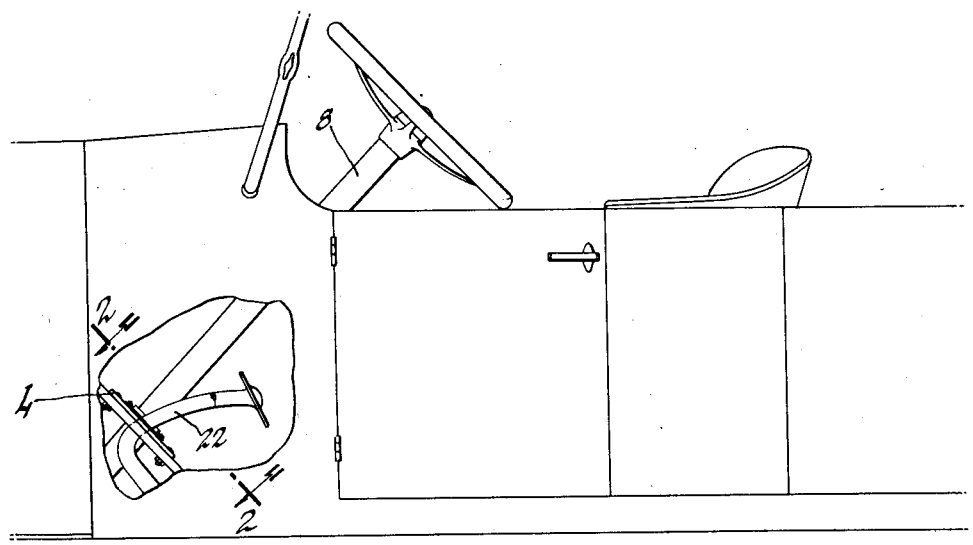
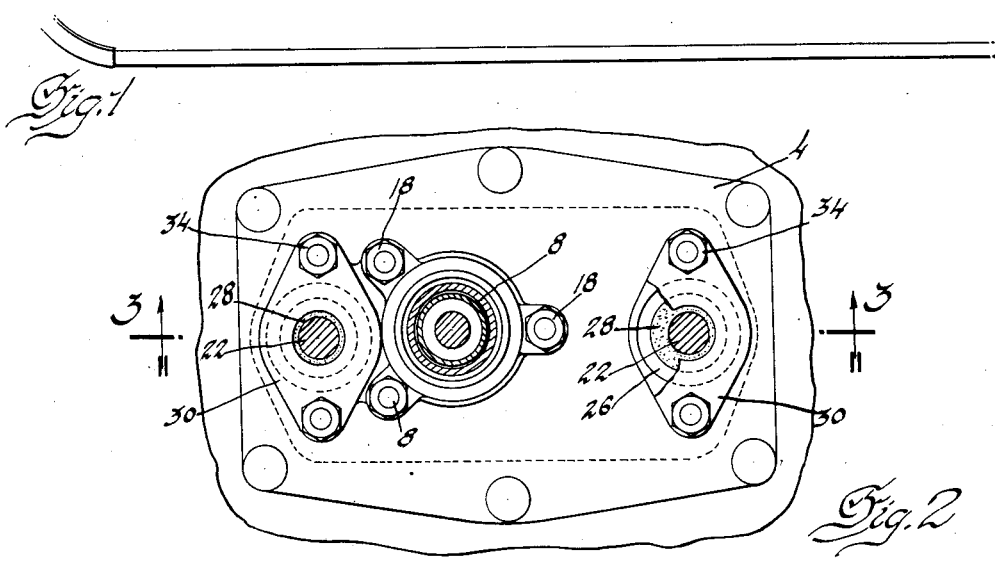
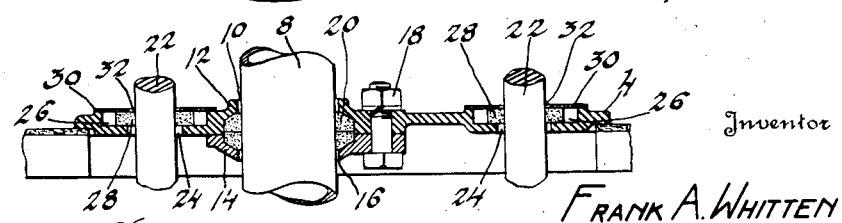
Inventor
FRANK A. WHITTEN
By Blackmore, Spencer & Flint
Attorneys Patented Apr. 2, 1929.

1,707,747

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

FLOOR PLATE AND STEERING-COLUMN SUPPORT.

Application filed November 6, 1925. Serial No. 67,391.

This invention relates to a floor plate and steering column support.

The object of the invention is to devise an improved plate to be secured over the usual opening in the floor board cut out to receive the steering post and the usual foot levers. It is a further object to provide means in connection with this floor plate to firmly but resiliently hold the steering column in position; and also to provide means in connection with the plate to secure a smooth and noiseless movement of the levers at the point of their passage through the floor.

With these and other objects in view, the invention further relates to arrangements and combinations of parts hereindescribed and more particularly pointed out in the claim.

One specific embodiment is shown in the accompanying drawing. It will be understood that the invention is not restricted to this single form as shown and described, but may be embodied in changes and modifications falling within the scope defined by the claim.

In the drawing, Figure 1 shows a side view of the vehicle, a part being broken away to show the application of the invention.

Figure 2 is a plan view of the floor plate and Figure 3 is a section on line 3—3 of Figure 2.

Referring to the drawing, numeral 4 is a plate of such shape and size as to cover the hole shown by dotted lines in Figure 2 as cut out of the floor board itself. At that part of the plate through which the steering column 8 passes, the plate is shown as provided with an opening 10 somewhat larger than the diameter of the steering column. This opening is surrounded by an angular flange 12. A corresponding flange member 14 with a registering opening 16 is clamped by bolts 18 against the underside of the plate 4. One or more washers 20 of rather stiff rubber snugly surround the steering column and also tightly fit within the space defined by the angular flanges. It will be seen that when the member 14 is clamped against plate 4 the rubber washers will be forced tightly against the steering column to hold it firmly but resiliently in place.

At those portions of the plate 4 through which the clutch and brake levers 22 pass, the plate is provided with openings 24 each surrounded by a counter-bore 26. Within the latter is a washer 28 of rubber or the like of less diameter than the diameter of the counter-bore but snugly fitting the lever. As will be seen the curved portion of the levers is of round stock bent in an arc whose centre is at the pedal shaft. The loose fit of the washers takes care of variation in the arc. Plate 30, with opening 32, registering with opening 24 of the floor plate is secured by fastening means 34 thus confining the washer in the counter-bore but with the necessary freedom of movement to accommodate the movement of the lever for operating the clutch or brake as the case may be.

By the use of the construction described, the steering post is held firmly but resiliently at the point where it passes through the floor board. The foot pedals are operable with a smooth and noiseless action, and the rubber washers absorb in large measures the vibration.

It may also be added that splashing of water up from the ground through the openings around the clutch and brake pedals is a frequent complaint against some passenger vehicles. Also in summer heated air and disagreeable gases, and in winter cold air, enter through these openings. The structure of my invention overcomes these faults.

I claim:

A plate having an opening therethrough, a member passing freely through said opening, the plate having a counter-bore around said opening, a resilient washer within said counter-bore snugly fitting around said member, but of less diameter than the counter-bore, said washer being free to move radially in said counter-bore to conform with the radial movement of said member, and a cover plate secured to the first plate and having an opening registering with the plate opening.

In testimony whereof I affix my signature.

FRANK A. WHITTEN.